United States Patent
Cook et al.

(10) Patent No.: US 9,538,703 B2
(45) Date of Patent: Jan. 10, 2017

(54) EASILY SERVICEABLE AND REMOVABLE SELF-ADJUSTING KNIFE ARM AND HEAD ASSEMBLY FOR A SICKLE

(75) Inventors: Joel T. Cook, Lititz, PA (US); Gary L. Bich, New Holland, PA (US); David M. DeChristopher, Ephrata, PA (US); Andrew R. Wilbert, Walworth, NY (US); Blaine R. Noll, Fleetwood, PA (US); Craig D. Roberts, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 135 days.

(21) Appl. No.: 14/128,126

(22) PCT Filed: May 29, 2012

(86) PCT No.: PCT/US2012/039869
§ 371 (c)(1),
(2), (4) Date: Apr. 25, 2014

(87) PCT Pub. No.: WO2012/166738
PCT Pub. Date: Dec. 6, 2012

(65) Prior Publication Data
US 2014/0230398 A1  Aug. 21, 2014

Related U.S. Application Data

(60) Provisional application No. 61/491,060, filed on May 27, 2011.

(51) Int. Cl.
*A01D 34/13* (2006.01)
*A01D 34/18* (2006.01)
(Continued)

(52) U.S. Cl.
CPC ............ *A01D 34/14* (2013.01); *A01D 34/145* (2013.01); *A01D 34/33* (2013.01)

(58) Field of Classification Search
CPC ...... A01D 34/14; A01D 34/13; A01D 34/145; A01D 34/135; A01D 34/30
(Continued)

(56) References Cited

U.S. PATENT DOCUMENTS

| 366,742 A | 7/1887 | Shull |
|---|---|---|
| 574,736 A | 1/1897 | Jarvis |

(Continued)

FOREIGN PATENT DOCUMENTS

| DE | 1043697 B | 11/1958 | |
|---|---|---|---|
| DE | 3314945 A1 * | 10/1984 | ............. A01D 34/30 |

(Continued)

*Primary Examiner* — Árpád Fábián-Kovács
(74) *Attorney, Agent, or Firm* — Peter K. Zacharias; Patrick M. Sheldrake

(57) ABSTRACT

The knife head mounts to the sickle to hold a plurality of knife sections thereon while allowing removal of the knife sections individually without major disassembly for ease of in field repair and replacement. A knife pin of the knife head connects to a knife arm driven by the sickle drive mechanism and is removable from above also without major disassembly. The knife pin connection provides a vertical self adjustment capability to accommodate sickle wear and vertical misalignment between the sickle and drive. And the knife arm is streamlined for cut plant material flow thereabout and is also adapted for ease of removal and field repair.

20 Claims, 16 Drawing Sheets

(51) Int. Cl.
*A01D 34/14* (2006.01)
*A01D 34/33* (2006.01)

(58) Field of Classification Search
USPC .................. 56/298, 296, 300, 158, 257, 307
See application file for complete search history.

(56) References Cited

U.S. PATENT DOCUMENTS

| | | | |
|---|---|---|---|
| 668,486 A | 2/1901 | Brown | |
| 738,033 A * | 9/1903 | Haynes et al. | A01D 34/135 56/297 |
| 755,164 A | 3/1904 | Pease | |
| 996,825 A | 7/1911 | Armentrout | |
| 1,218,511 A * | 3/1917 | Berglund | A01D 34/14 56/302 |
| 1,231,111 A | 6/1917 | Alford | |
| 1,390,753 A | 9/1921 | Frederick | |
| 1,428,657 A * | 9/1922 | Purdy | A01D 34/16 30/221 |
| 1,622,299 A | 3/1927 | Wanamaker | |
| 2,332,840 A | 10/1943 | Boyer | |
| 2,431,663 A * | 11/1947 | Scranton | A01D 34/18 29/891.2 |
| 3,058,288 A * | 10/1962 | Karg | A01D 34/135 56/297 |
| 3,397,584 A | 8/1968 | Koch | |
| 3,722,196 A * | 3/1973 | Templeton | A01D 34/16 56/298 |
| 3,896,610 A | 7/1975 | Hiniker | |
| 4,021,999 A * | 5/1977 | Case | A01D 34/13 56/298 |
| 4,023,333 A | 5/1977 | Anderson | |
| 4,067,179 A * | 1/1978 | Schneider | A01D 34/30 56/297 |
| 4,198,803 A * | 4/1980 | Quick | A01D 34/13 56/296 |
| 4,267,689 A * | 5/1981 | Schneider | A01D 45/021 56/275 |
| 4,272,948 A | 6/1981 | Dolberg et al. | |
| 4,342,186 A | 8/1982 | Stikeleather et al. | |
| 4,418,520 A | 12/1983 | Schneider et al. | |
| 4,805,390 A * | 2/1989 | Majkrzak | A01D 34/14 403/341 |
| 4,909,025 A * | 3/1990 | Reissig | A01D 34/305 56/257 |
| 4,909,026 A * | 3/1990 | Molzahn | A01D 34/17 56/298 |
| 5,024,051 A * | 6/1991 | Glass | A01D 34/14 411/366.2 |
| 5,040,363 A * | 8/1991 | Limburg | A01D 34/14 56/300 |
| 5,161,357 A * | 11/1992 | Braunberger | A01D 34/14 403/312 |
| 5,343,682 A * | 9/1994 | Puncochar | A01D 34/17 56/305 |
| 5,979,152 A * | 11/1999 | McCredie | A01D 34/16 56/298 |
| 6,708,476 B1 * | 3/2004 | Blakeslee | A01D 34/135 56/257 |
| 6,886,316 B2 | 5/2005 | Schumacher | |
| 7,121,074 B1 | 10/2006 | Regier et al. | |
| 7,124,567 B1 * | 10/2006 | Adamson | A01D 34/14 56/296 |
| 7,313,903 B2 * | 1/2008 | Schumacher | A01D 34/16 56/304 |
| 7,464,527 B2 * | 12/2008 | Blakeslee | A01D 34/17 56/298 |
| 7,478,522 B1 * | 1/2009 | Lovett | A01D 41/14 56/296 |
| 7,861,505 B1 | 1/2011 | Figgins et al. | |
| 2,133,277 A1 | 4/2011 | Bennett | |
| 7,937,920 B2 | 5/2011 | Schmidt et al. | |
| 8,151,547 B2 * | 4/2012 | Bich | A01D 34/30 56/158 |
| 8,893,462 B2 * | 11/2014 | Talbot | A01D 34/13 56/298 |
| 2005/0028505 A1 * | 2/2005 | Schumacher | A01D 34/14 56/296 |
| 2008/0006016 A1 * | 1/2008 | Snider | A01D 34/135 56/297 |
| 2011/0078989 A1 | 4/2011 | Bich et al. | |
| 2011/0099964 A1 * | 5/2011 | Coers | A01D 34/30 56/296 |
| 2014/0215995 A1 * | 8/2014 | Cook | A01D 34/145 56/301 |

FOREIGN PATENT DOCUMENTS

| | | | |
|---|---|---|---|
| DE | 19826289 C1 | 2/2000 | |
| EP | 2570017 A1 | 3/2013 | |
| IT | 1125490 A1 * | 8/2001 | A01D 34/08 |
| RU | 2379876 C2 | 1/2010 | |

* cited by examiner

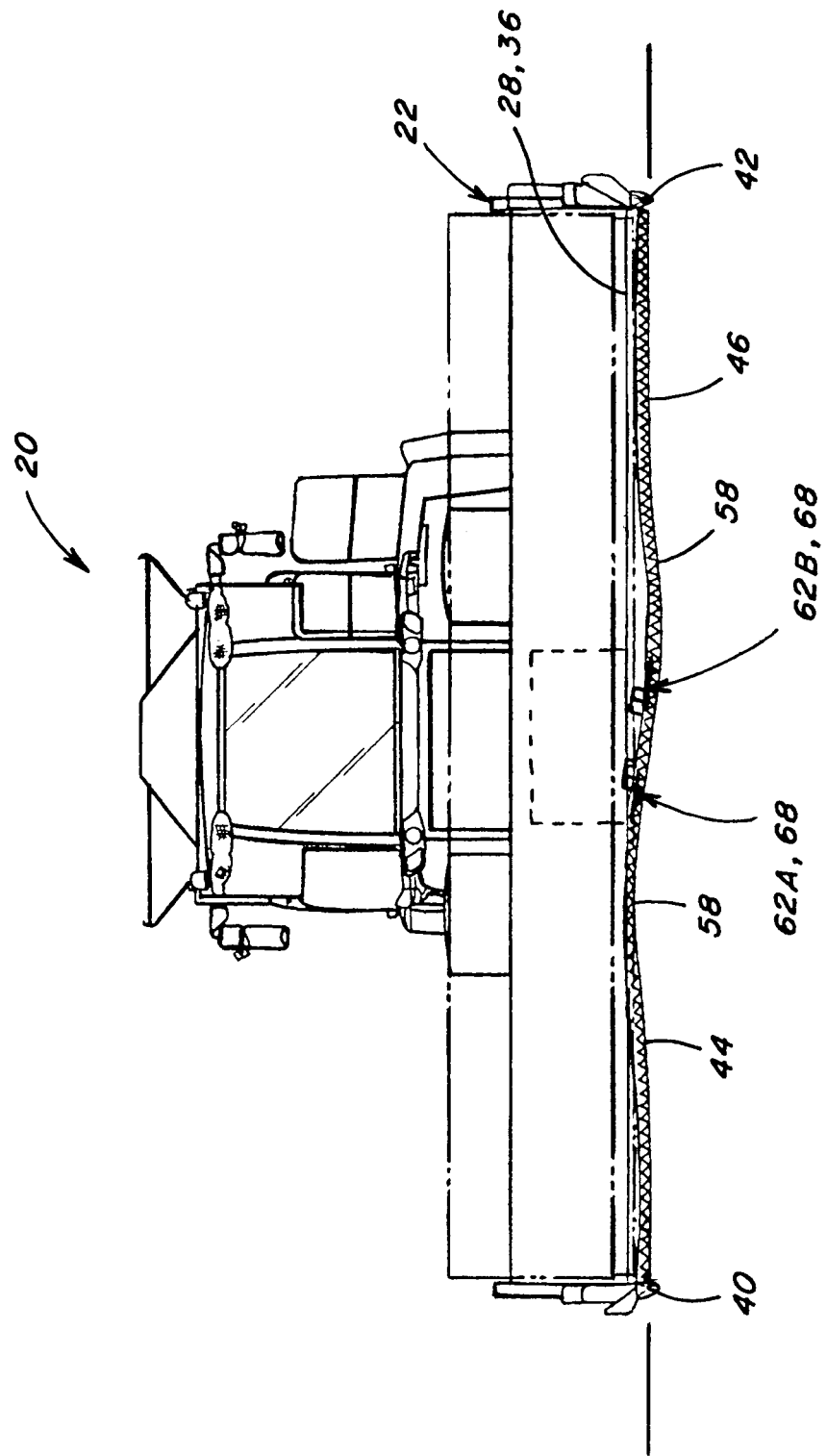

EASILY SERVICEABLE AND REMOVABLE SELF-ADJUSTING KNIFE ARM AND HEAD ASSEMBLY FOR A SICKLE

CROSS REFERENCE TO RELATED APPLICATIONS

This application is the US National Stage for International Application No. PCT/US12/39869, filed on May 29, 2012, which itself is related to and claims the benefit of U.S. Provisional Application No. 61/491,060, filed May 27, 2011.

TECHNICAL FIELD

This invention relates generally to a knife arm and head assembly for the sickle of a header of an agricultural cutting machine, such as a combine, windrower or other crop harvesting machine, or a mower, and more particularly, to a knife arm and head assembly that is easily serviceable, removable and replaceable, to reduce complexity and downtime for repair and replacement of components, particularly, the knife and knife sections of the sickle that are expected to wear and break from time to time, and which assembly is vertically self adjusting to compensate for wear and vertical misalignment of the sickle and sickle drive.

BACKGROUND ART

The disclosure of U.S. Provisional Application No. 61/491,060, filed May 27, 2011, is hereby incorporated herein in its entirety by reference.

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

A knife assembly, which will weigh from 35 to 38 pounds for a typical 20 foot wide header, typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. Other damage that can occur includes dulled, chipped, and broken knife sections, that will result in unsatisfactory plant cutting, necessitating replacement of the damaged sections.

The knife sections and supporting structure are also subject to general wear, e.g., from friction, which can be accelerated by use in abrasive environments such as dusty areas and some plant varieties. As a result, the vertical height or position of the knife assembly can gradually lower relative to the drive mechanism which reciprocatingly propels it sidewardly. And, when changing worn components such as knife sections, the new knife sections may be thicker, which can change the vertical relationship between the top of the knife assembly and the drive mechanism. Also, some stationary bars may have some vertical flexibility, which can result in variances between the heights of the knife assembly and drive during operation, for instance, resulting from passage of the sickle over uneven terrain.

Known reciprocating sickle drives include, but are not limited to, an eccentric shaft on a rotating hub, a wobble drive, or a similar well known commercially available device. Such drives are typically located at the sides of the header, so as to drive the knife assembly from the end. Reference in this regard, the modern side located epicyclical sickle drive of Regier et al., U.S. Pat. No. 7,121,074 B1 issued Oct. 17, 2006, which illustrates a representative simple end connection to a sickle. An end connection is advantageous as it allows easy and quick disconnection of the drive from the knife assembly and removal and replacement thereof, it does not interfere with access to individual knife sections for removal and replacement, and it allows substantial flexibility and variance between the relative locations of the drive mechanism and the sickle.

Disadvantages of the side drive location include that the header must include significant frame structure for supporting the drive and to withstand forces and vibrations generated thereby. The end structure or crop divider at the end of the header must also be relatively wide, to accommodate the drive and to direct adjacent standing crops therepast, and increasing the possibility of accidentally pushing down adjacent standing crops. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

Driving a knife assembly or assemblies of a header from a more central location, such as the center of the header, is desirable as it provides several advantages compared to a side location. As a result, center drive mechanisms have been developed. Reference in this regard, Priepke U.S. Pat. Nos. 7,810,304; 7,805,919; 7,730,709; 7,520,118; and 7,401,458, and Bich U.S. Pat. No. 8,011,272 which disclose a family of vertically compact sickle drive or drives incorporated in or below a header floor, which overcome many of the disadvantages and shortcomings discussed above in regard to side drives. However, locating the sickle drive mechanism in or below the header floor can still result in the apparatus connecting the drive or drives with the knife assembly or assemblies being in the path of the cut plant material moving rearwardly past the sickle, so as to interfere with and/or split the material flow and even cause some plowing and accumulation of the cut plant material in front of the connecting apparatus. Therefore, it would be desirable to minimize such interference and splitting of the material flow.

Reference also Bich et al. U.S. Pat. No. 8,151,547 which discloses a knife arm assembly, configured for attachment to a center drive, which has the shortcomings of a knife head requiring an intermediary member for attachment to the knife, and removal and replacement of the knife pin of which connecting the knife head to the knife arm requires removal of the entire knife head from the sickle knife.

It would also be desirable to have a manner of adjusting or compensating for any differences or variances between the height of the drive mechanism or mechanisms and the knife assembly or assemblies, for accommodating manufacturing and assembly variations, tolerances, and wear, and to avoid increased friction and binding that can increase wear on both the sickle and drive and increase power consumption.

As another consideration, when individual or groups of knife sections are worn beyond their useful life, or are broken or damaged, so as to require removal and replacement, it would be desirable to have a manner of replacing them quickly and easily, particularly in the field during plant cutting operations, to minimize downtime and effects on production.

Still further, it would be desirable to have the ability to remove and replace the knife pin of a knife head, without having to remove the entire knife head from the sickle knife for service.

Therefore, what is sought is apparatus for connection of a sickle drive to the knife of a sickle, adapted for use along the length of a sickle, e.g., at a more central location on a header, which provides ease of removal, service and replacement, minimizes interruption and splitting of plant material flow, is vertically self-adjusting, and provides one or more of the other features, while overcoming one or more of the shortcomings and limitations, set forth above.

SUMMARY OF THE INVENTION

What is disclosed is a knife head and arm assembly for connecting a sickle drive to the knife of a sickle, adapted for use anywhere along the length of a sickle, which provides ease of removal, service and replacement, minimizes interruption and splitting of plant material flow, provides a vertical self-adjusting capability, and which overcomes one or more of the shortcomings and limitations set forth above.

According to a preferred aspect of the invention, the knife head is an elongate, low profile member attached by an array of fasteners to an elongate structural beam of the sickle cutter. A longitudinally extending, side by side array of sickle knife sections are disposed between the knife head and the beam, and are securely clamped or captured by the attachment of the knife head. Attachment in this manner allows locating the knife head at any desired position along the knife assembly.

As another preferred aspect of the invention, the knife head includes at least one longitudinally extending portion having increased vertical flexibility. This can be incorporated into the knife head as a stepped or tapered shape and additionally provides a low profile. The increased flexibility is advantageous as it allows the knife head and underlying portion of the sickle knife to flex if required, for instance, if bent, or if the sickle is of the flexible variety.

As another preferred aspect of the invention, the knife head includes an upstanding knife pin. A single fastener, removable solely from above the knife head, secures the knife pin. This facilitates removal and replacement of the knife pin from above, without having to access the underside of the knife head, or removing it from the sickle. The knife pin is configured to be cooperatively received in a downwardly open receptacle of a knife arm of the invention which attaches to and will be supported by the sickle drive mechanism in cantilever relation above the knife head.

The knife pin has an outer bearing surface therearound, preferably of a cylindrical or other suitable shape to facilitate limited relative vertical movements of the knife head and knife arm. As a result, this feature can provide an amount of self-adjustability in the relative positions of the knife arm and knife head, to reduce possible occurrence of binding, accelerated wear, power consumption, and other undesirable conditions. As the knife assembly and supporting structure wear, this will also allow the knife head to gradually lower relative to the knife arm, without affecting the ability of the assembly to reciprocatingly drive the sickle. If used with a flexible sickle, the capability of the knife head to move vertically relative to the knife arm can facilitate flexing of the sickle in the immediate vicinity of the knife head, which can reduce binding, wear and power consumption.

According to another aspect of the invention, the knife arm has a mounting end configured for attachment to the drive mechanism for reciprocating sideward movement therewith, but which allows quick and easy removal of the knife head. The knife arm includes a distal end opposite the mounting end disposed to be supported in cantilever relation to the drive mechanism. The distal end includes an inner bearing surface bounding and defining the downwardly open receptacle configured for cooperatively receiving the knife pin with the inner bearing surface intimately contacting the outer bearing surface therearound for holding the pin in the receptacle sufficiently to allow the knife arm and attached knife assembly to follow their intended sideward reciprocating path, while optionally allowing a limited amount of upward and downward movement relative to the knife arm and thus the drive mechanism during the movement. The bearing surfaces are preferably relatively large, so as to be robust and to distribute loads and wear.

According to another preferred aspect of the invention, the distal end of the knife arm has opposite sides that taper divergingly in the rearward direction from the distal end about the receptacle to the mounting end, to provide a streamlined shape for facilitating flow of plant material therepast and to reduce plowing and other undesirable effects. This is preferably embodied in the knife arm having a V- or U-shape about the receptacle that tapers sidewardly outwardly to about the width of the element of the driving mechanism to which the knife arm is attached. As another preferred aspect, the upper end of the receptacle is enclosed or covered. This contributes to the streamlined effect, and reduces possibility of entry of contaminants into the receptacle. This also covers and protects the fastener attaching the knife pin to the knife head.

As another advantage of the present invention, the manner of attachment of the knife head to the sickle structure distributes the loads generated during the plant cutting operation over the several fasteners, e.g., preferably eight or more, as opposed to just one or two fasteners at the end of the sickle knife, while still enabling relatively smooth plant material flow thereover and desired flexure. This manner of attachment also enables selected ones of the fasteners to be removed while the knife head remains attached to the sickle, as necessary for removing and replacing selected ones of the sickle knife sections. This is advantageous for field service, as the knife sections can be removed and replaced with minimal disassembly, reassembly, and downtime.

As another alternative according to the invention, the in place of a bearing element that provides substantially free relative pivotal movement between the knife head and knife arm, a torsion element can be used that connects the knife head and knife arm, comprising a rubber or rubbery material that is loaded in torsion when the knife head and knife arm are relatively pivoted or rotated. This element can be connected in the manner of a pillow block or clamp to the knife arm and with a simple threaded bolt or screw to the knife head, for easy and quick removal and replacement.

BRIEF DESCRIPTION OF THE DRAWINGS

FIG. 3A is another front view of the harvester and header, with a sickle of the header flexed;

DETAILED DESCRIPTION OF THE INVENTION

Figure 1:
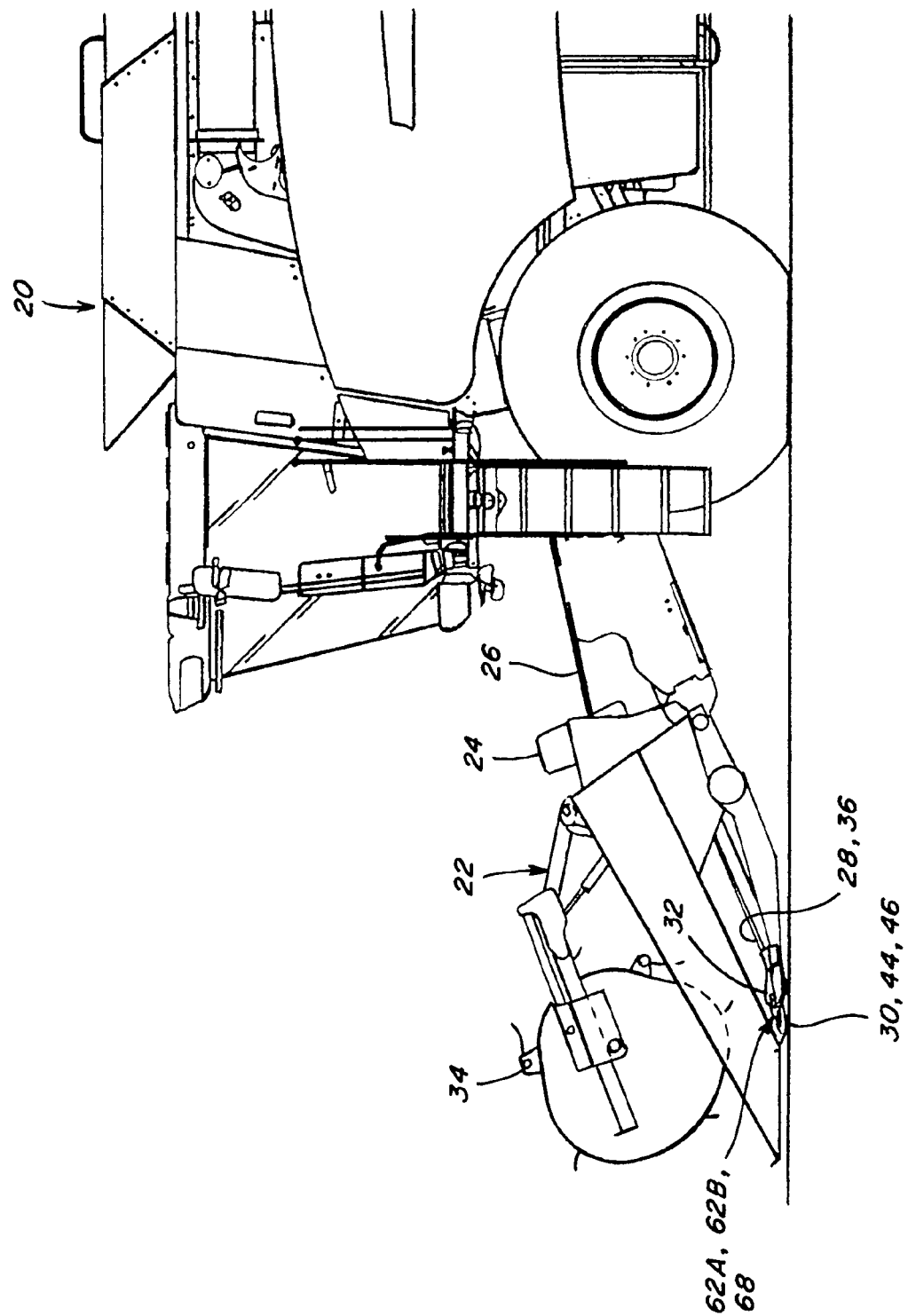
FIG. 1 is a fragmentary side view of a harvester including a header having sickle knife head and arm assemblies according to the invention.
Figure 2:
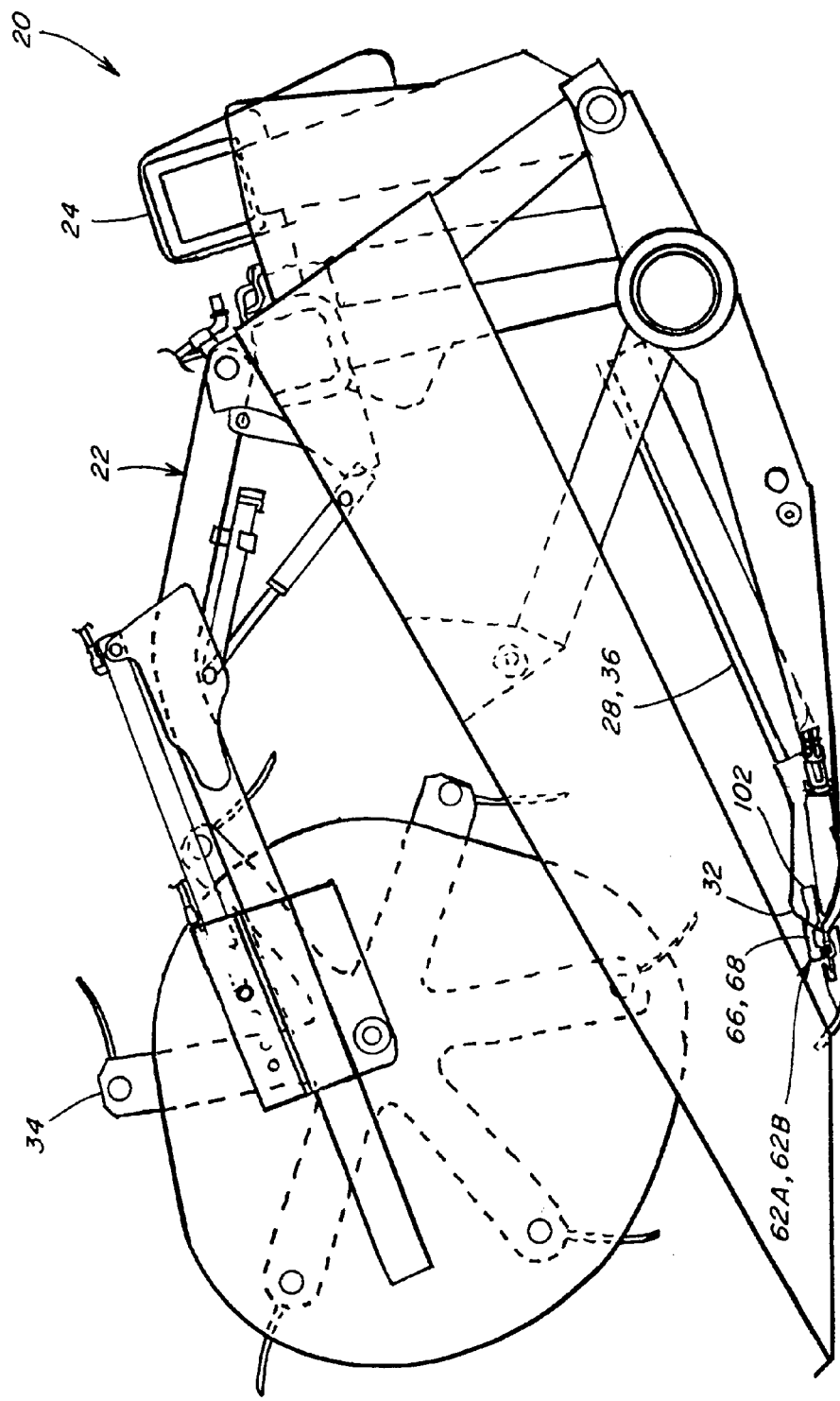
FIG. 2 is an enlarged fragmentary side view of the header and sickle knife head and arm assemblies of the invention.

Turning now to the drawings wherein a preferred embodiment of the invention is shown, in FIGS. 1 through 5, a conventional, well known agricultural cutting machine, which is a combine 20, is shown including a header 22. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 3:
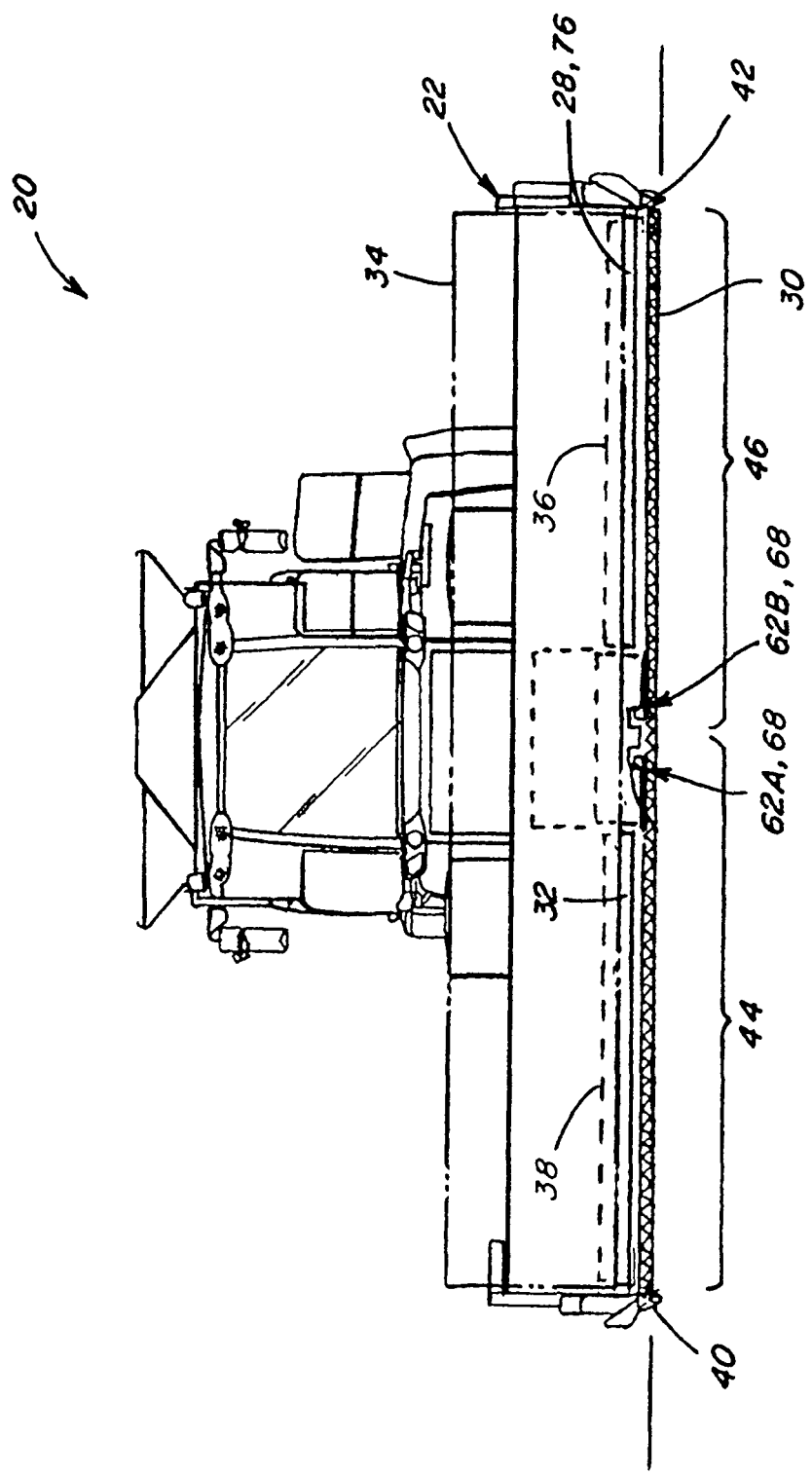
FIG. 3 is a front view of the harvester and header, showing the location of the sickle knife head and arm assemblies.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
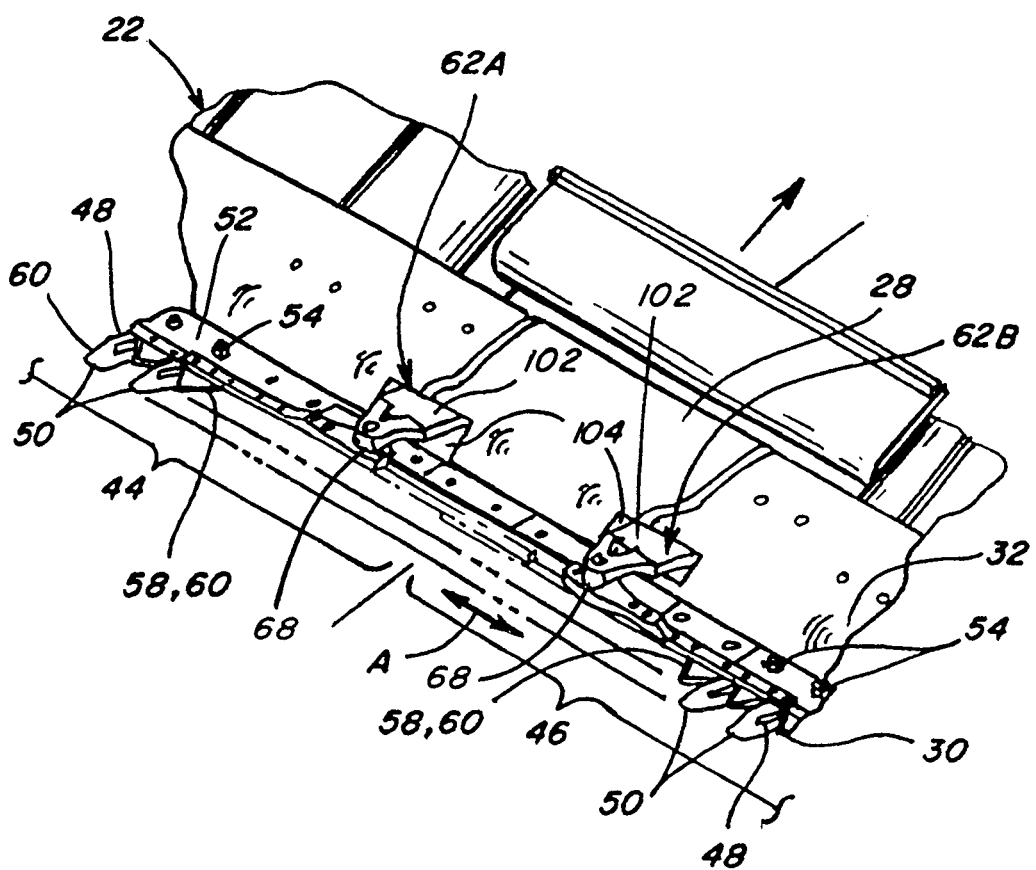
FIG. 4 is a fragmentary perspective view of the header, showing aspects of the sickle knife head and arm assemblies.
Figure 5:
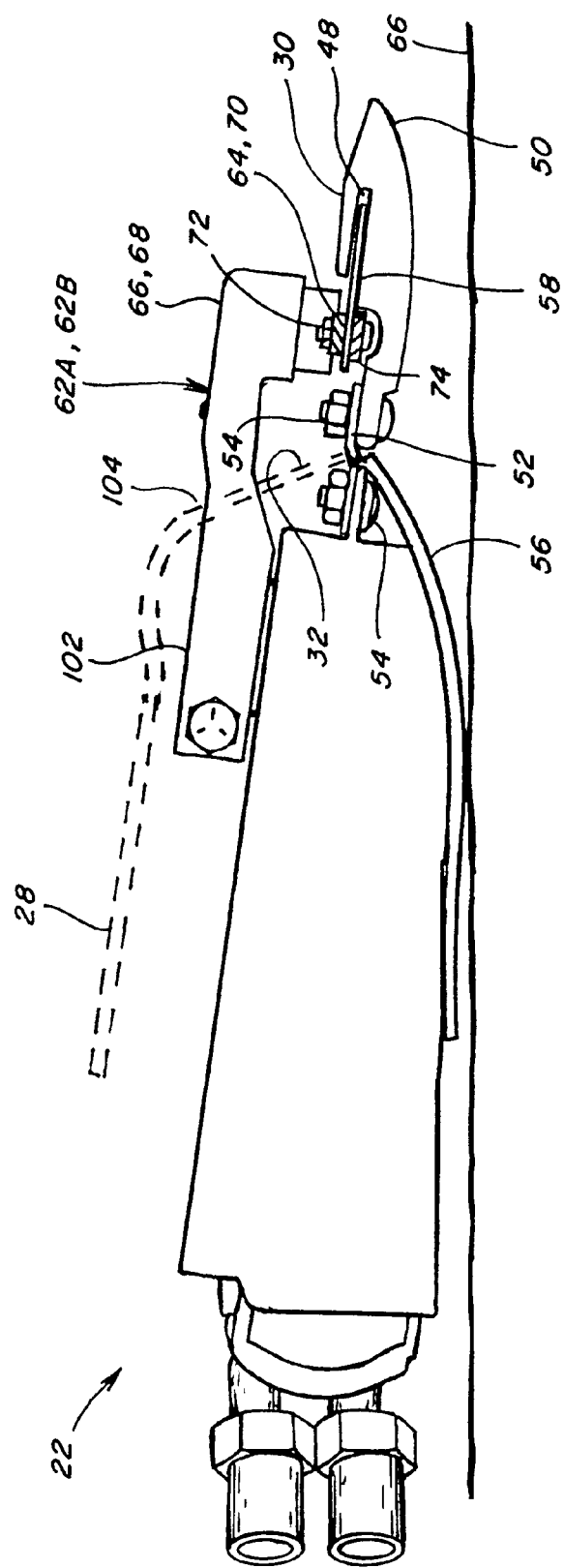
FIG. 5 is an enlarged side view showing aspects of the header, sickle drives, and the sickle knife head and arm assemblies.
Figure 6:
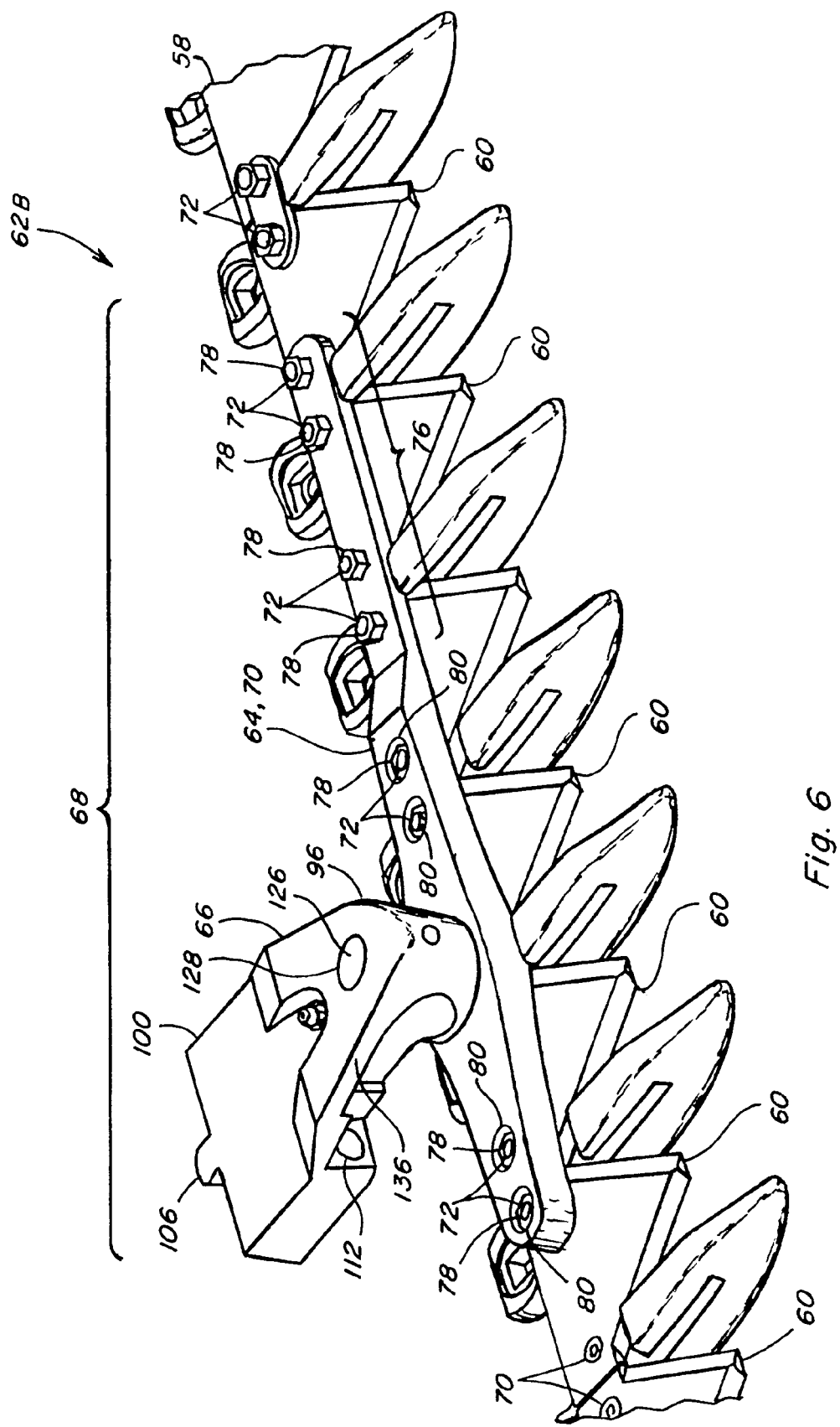
FIG. 6 is a fragmentary perspective view of the sickle, showing one of the knife head and arm assemblies.

Referring more particularly to FIGS. 4 and 5, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 having a row of knife sections 60 including oppositely facing, angularly related knife edges which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

Knife assemblies 58 are reciprocatingly driven utilizing first and second sickle drives 62A and 62B. First and second sickle drives 62A and 62B are illustrated in FIGS. 3 and 4 at a center location on header 22 between side edge portions 40 and 42 at the opposite ends of the header, although it should be noted that it is contemplated that sickle drives 62A and 62B could alternatively be utilized at other locations on a header, and that multiple sickle drives 62 could be used at multiple locations on a header. Sickle drives 62A and 62B are preferably located completely within or beneath floor 28 as best shown in FIG. 5, to reduce interruption of flow of cut plant material thereover and thereabout. Drives 62A and 62B can comprise a variety of mechanisms, such as, but not limited to, epicyclical drives that impart purely linear sideward motion, or pivoting sideward motion, to the knife head assemblies, as desired or required for a particular application. The disclosures and teachings of Priepke U.S. Pat. Nos. 7,810,304; 7,805,919; 7,730,709; 7,520,118; and 7,401,458, and Bich U.S. Pat. No. 8,011,272 are hereby incorporated by reference herein in their entireties, as representative non-limiting examples of drives that can be utilized with the present invention.

Sickle drives 62A and 62B include drive elements 102 that project forwardly through slots 104 or other openings in or in the vicinity of forward edge portion 32 of floor 28, for connection to the respective knife assemblies 58, and which are moved in a side to side reciprocating motion by the respective drive, for effecting the cutting action. Header 22 includes knife heads 64 and knife arms 66 cooperatively arranged in knife head and arm assemblies 68 constructed and operable according to the present invention, connecting drives 62A and 62B in driving relation with respective knife assemblies 58. As is evident from the location of knife head and arm assemblies 68, they will be located directly in the path of the rearward flow of cut plant material over forward edge 32 and onto the upper surface of floor 28 during plant cutting operations. As a result, if assemblies 68 are large and/or obtrusive, they can have a plowing effect, causing the plant material to build up forwardly thereof, and/or be split or interrupted, so as to not flow smoothly onto the floor. It is therefore desired to minimize such flow disruptions.

Additionally, as noted above under the Background Art heading, from time to time, the knife sections 60 will be damaged, e.g., broken, chipped, become worn, or for other reasons require removal and replacement. Sometimes, this will be during plant cutting or harvesting, and thus in the field, and it will be desired to accomplish the removal and replacement as quickly as possible, with minimal removal/disassembly of components. It has also been found that a limited amount of relative vertical movement between the drive 62A or 62B and the knife assemblies 58 is desirable to facilitate free reciprocating movement of the knife assemblies, both to accommodate knife wear and flexing if so configured, as illustrated by the flexed cutter bar assemblies 46 and 48, in FIG. 3A.

Figure 14:
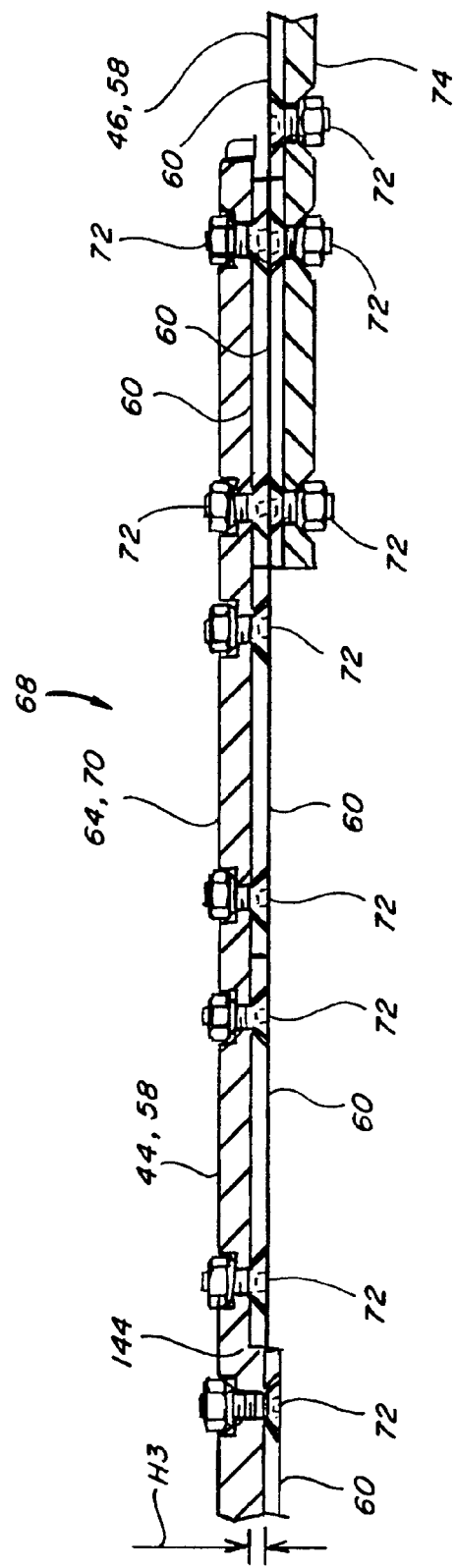
FIG. 14 is a fragmentary sectional view of an alternative knife head having a stepped surface for attachment of knife sections of the sickle.

Referring also to FIGS. 6 through 15, knife head and arm assemblies 68 each comprise an elongate member 70 attached by an array of threaded fasteners 72 to an elongate structural beam 74 (FIGS. 5, 10, 11, 12, and 14) underlying the respective knife head assembly 58 of the sickle cutter (beam 74 omitted from knife assembly 58 of cutter bar assembly 44 in FIG. 14 as will be discussed). Several of knife sections 60 of the respective knife assembly 58 are disposed between beam 74 and member 70, so as to be clamped or captured by this attachment, while the other knife sections 60 of the knife assembly are mounted in the well known manner using additional fasteners 72 for direct attachment to beam 74. Features of knife head 64 include controlled or limited vertical flexibility, which provides an ability to bend or flex to a limited extent with portions of a sickle attached thereto. This capability is preferably achieved by reducing the vertical height or extent of at least one longitudinal end 76 of member 70 relative to a middle or opposite end, as denoted by heights H1 and H2 in FIG. 12, resulting in a stepped shape, although it should be recognized that a tapered or other shape that imparts desired flexibility can alternatively be used. Fasteners 72 here comprise bolts which are inserted from below and extend upwardly through mating holes in beam 74, knife sections 60 and knife head 64, at the top of which they threadedly engage nuts 78. On end 76, nuts 78 are located on top of member 70. On the thicker region, nuts 78 are located in upwardly facing sockets 80 recessed into the top surface of member 70, such that the same length fasteners 72 can be used at both locations if desired. Fasteners 72 are arranged in a spaced apart longitudinally extending array, and are provided in sufficient number, e.g., eight or more, to provide secure attachment to beam 74 for clamping or capturing knife sections 60, and for withstanding shear loads generated by the side to side cutting motion and reciprocating action, which will be longitudinal with respect to member 70.

Figure 12:
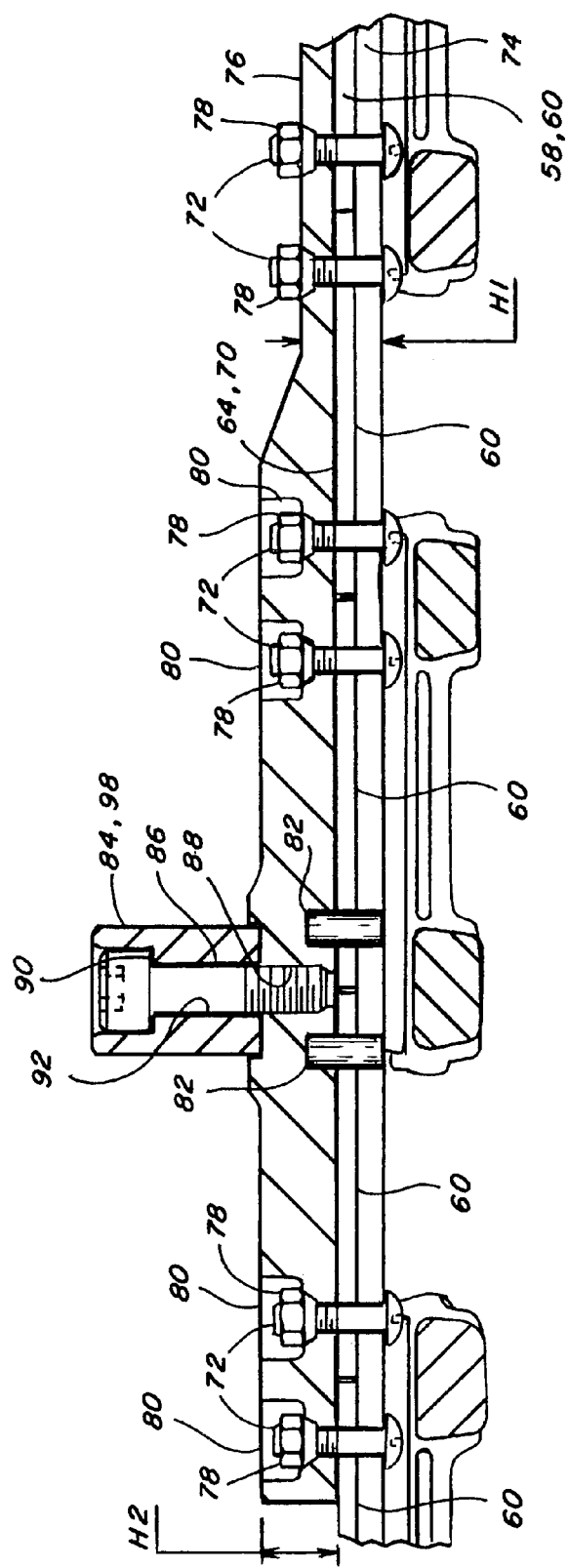
FIG. 12 is a fragmentary sectional view of the sickle, showing one of the knife heads.
Figure 13:
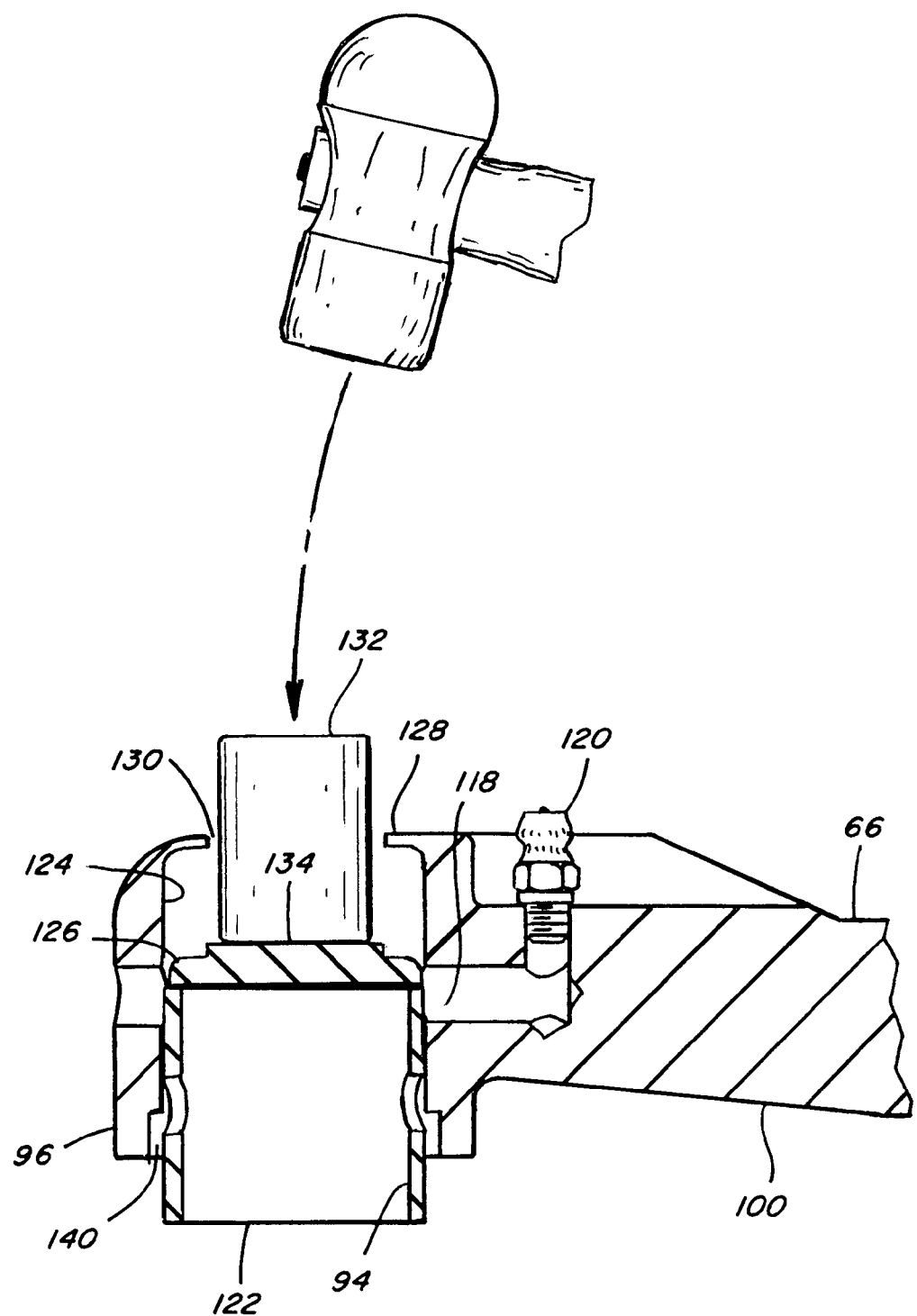
FIG. 13 is another fragmentary sectional view of one of the knife arms, showing removal of a bushing thereof.

To provide added shear strength and a means to better align the holes of knife head 64, knife sections 60 and beam 74, knife head 64 preferably carries at least one and preferably two downwardly extending pins 82 positioned to be received in aligned holes in one or more of the knife sections and the beam, as shown in FIG. 12. Pins 82 are preferably disposed at a predetermined location corresponding or in close proximity to a knife pin 84 which is positioned for connection to knife arm 66. Knife pin 84 is preferably mounted on the top surface of knife head 64, by a threaded fastener 86 threadedly received in a threaded hole 88 in the upper surface of knife head 64. When fastener 86 is tightened, its head is brought to bear against a shoulder 90 extending about the upper end of a hole 92 through the pin which receives fastener 86. This arrangement allows removal of knife pin 84 from knife head 64 merely by removing fastener 86, without accessing the underside of the knife head or removing it from the sickle.

Knife pin 84 is configured to be cooperatively received in a downwardly open receptacle 94 in a distal end 96 of knife arm 66 for connection to the respective drive 62A or 62B. Here, knife pin 84 has a smooth straight outer surface 98 therearound which is preferably cylindrical shaped and sized to be matingly received in receptacle 94, optionally for up and down movement therein to facilitate relative up and down movement of knife head 64 and knife arm 66, as denoted by arrows VM in FIG. 11.

Figure 7:
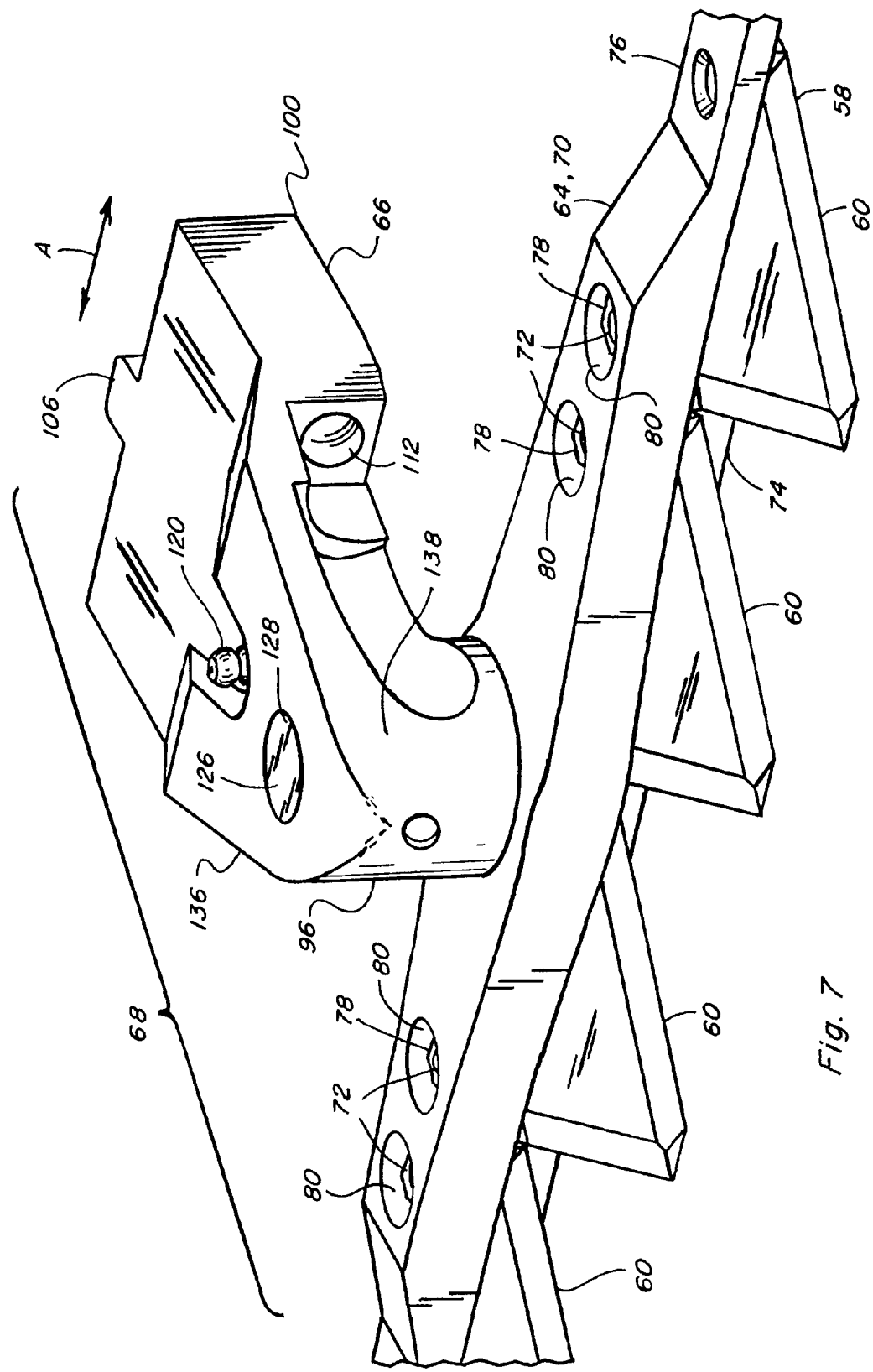
FIG. 7 is another fragmentary perspective view of the sickle, showing one of the knife head and arm assemblies.
Figure 8:
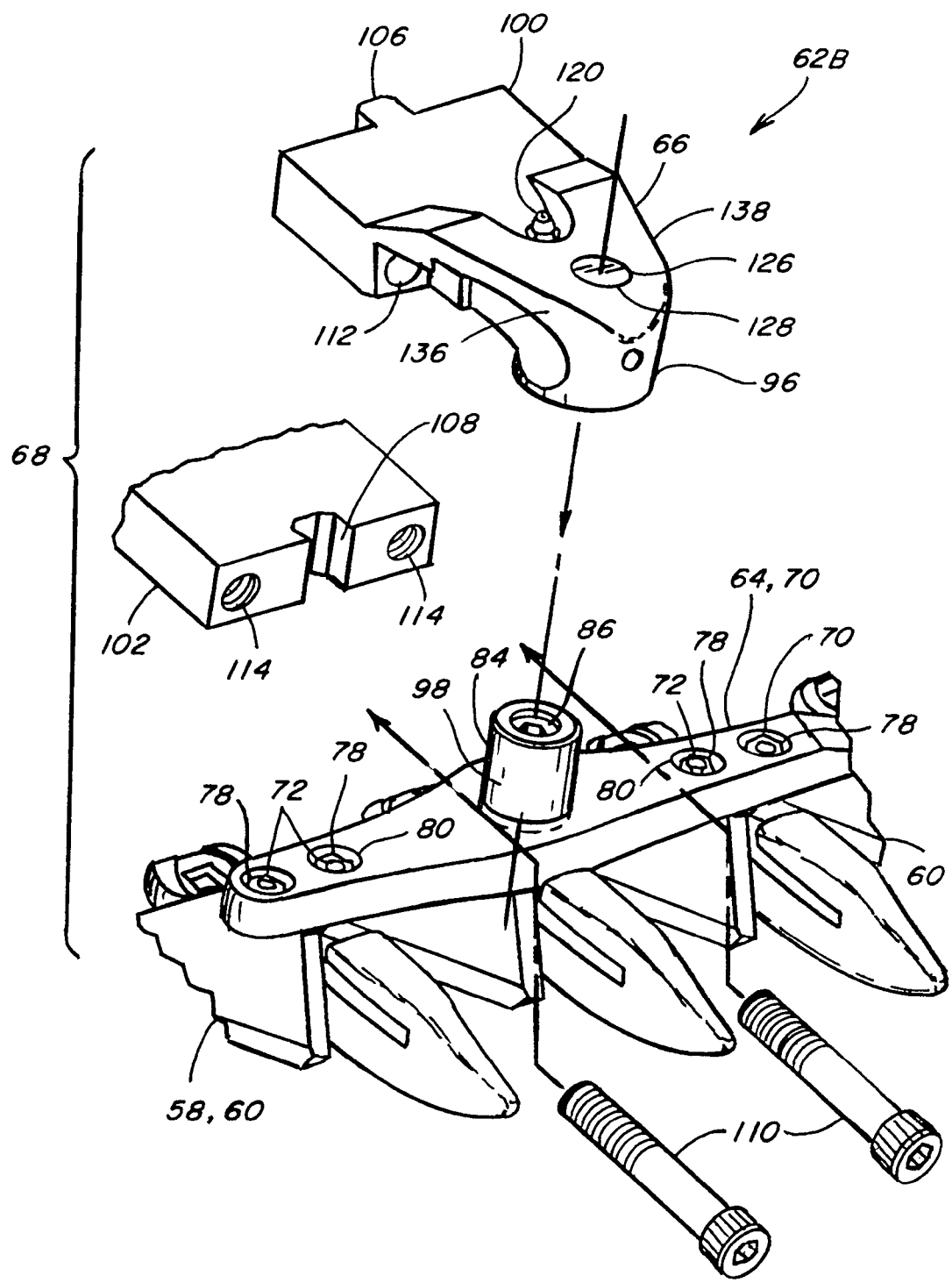
FIG. 8 is a fragmentary perspective exploded view of the sickle, showing aspects of one of the knife head and arm assemblies.
Figure 9:
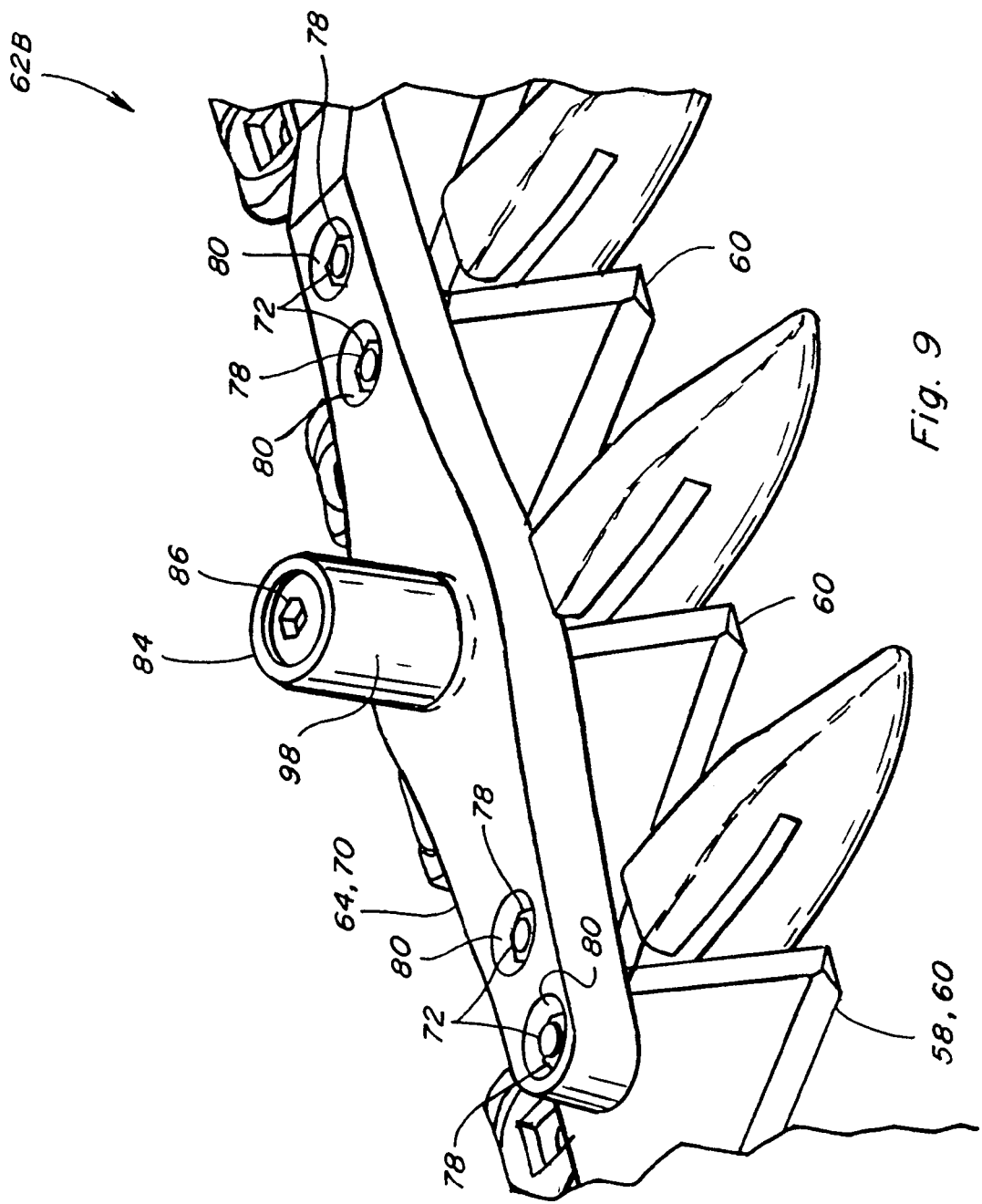
FIG. 9 is a fragmentary perspective view of the sickle and one of the knife heads.
Figure 10:
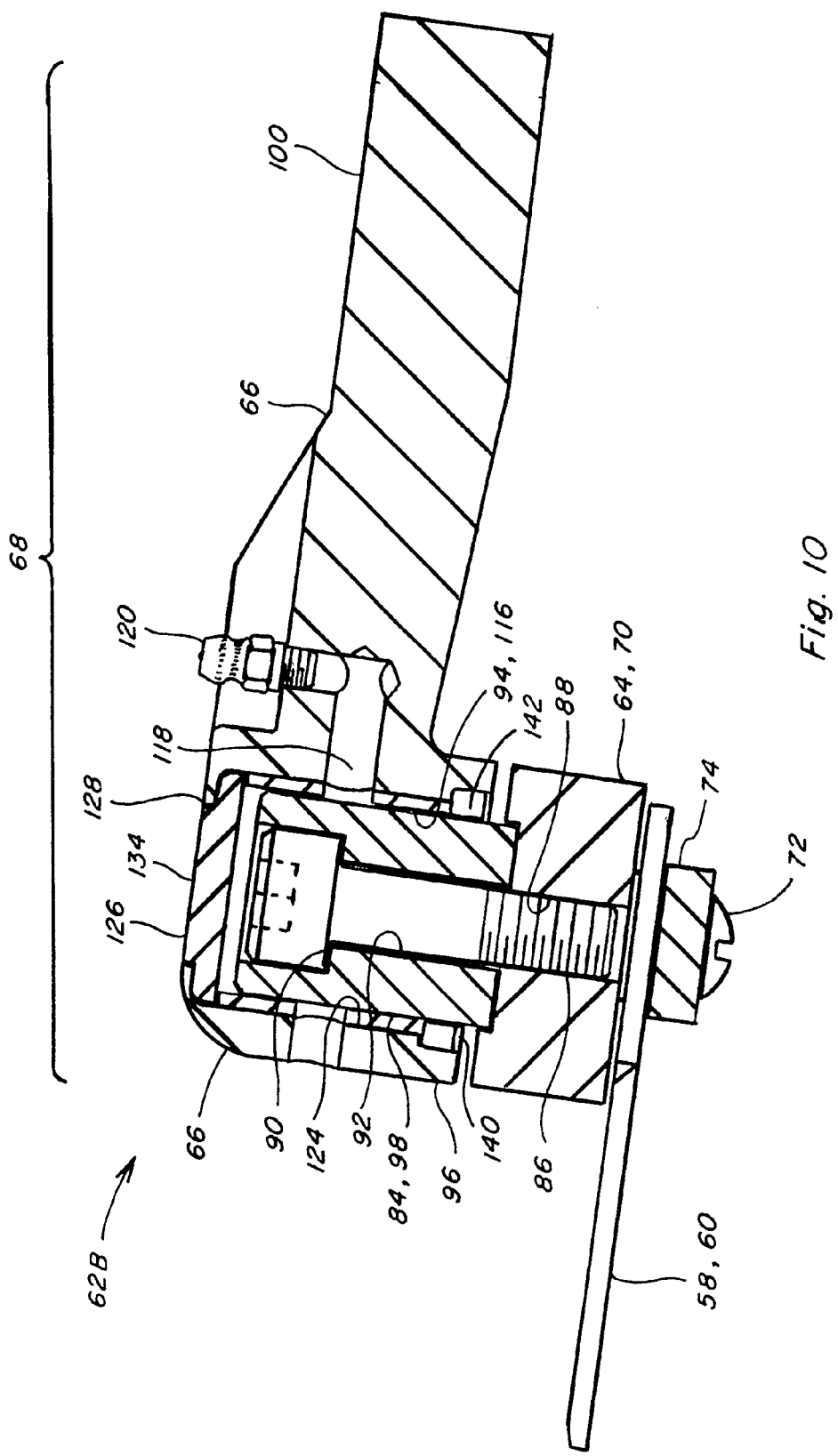
FIG. 10 is a fragmentary sectional view of the sickle, showing one of the knife head and arm assemblies.
Figure 11:
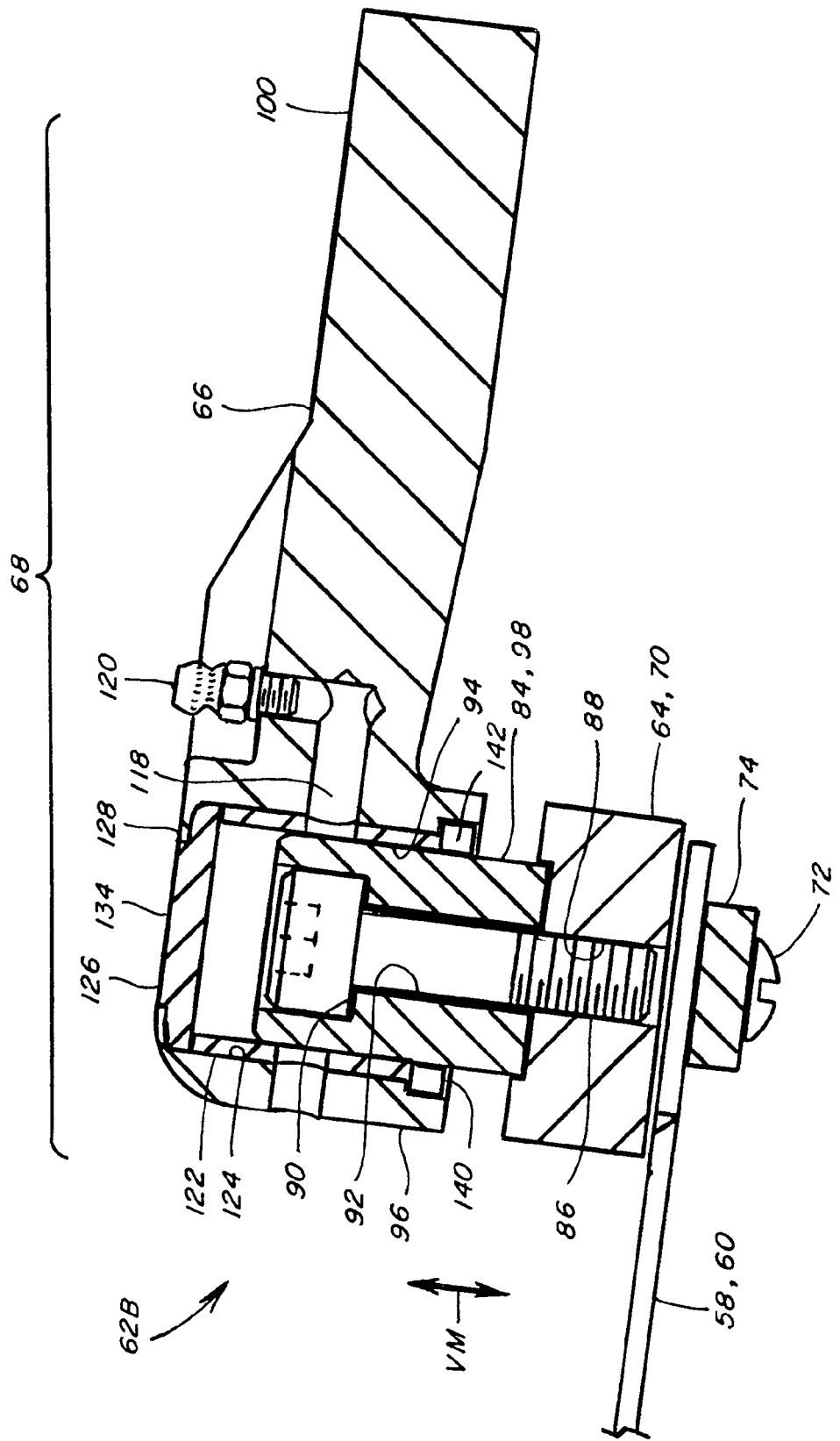
FIG. 11 is another fragmentary sectional view of the sickle, showing one of the knife head and arm assemblies, with vertical separation between the knife head and knife arm.

Knife arm 66 has a mounting end 100 opposite distal end 96, configured for attachment to a drive element 102 of drive 62A or 62B for reciprocating sideward movement therewith, as denoted by arrow A in FIG. 7 (and FIG. 4). Recall here that the movement can be straight side to side or sideward pivoting movement, which will be a function of the type of drive used. Here also, it can be observed that the connection with drive element 102 includes a vertical key 106 which is cooperatively received in vertical keyway 108 in the drive element 102 to provide ease of alignment and strength under side to side shear loading conditions generated by the plant cutting action. Knife arm 66 is held in position on the end of element 102 by threaded fasteners 110 received in holes 112 in arm 66 and threadedly engaged with threaded holes 114 in drive element 102, as illustrated in FIG. 8.

Addressing receptacle 94 of knife arm 66, it is preferably bounded and defined by an inner bearing surface 116 which bounds and defines receptacle 94, and which here is also cylindrical shaped, and sized for receiving knife pin 84. The fit between inner surface 116 and outer surface 98 of the knife pin can be tight, or can allow relatively free vertical movement between knife arm 66 and knife pin 84 if that is desired, but virtually no lateral play, which optional vertical movement will be limited to a maximum distance VM (FIG. 11) by the fixed vertical location of knife arm 66 by virtue of its attachment to element 102 of drive 62A or 62B, and the retention of knife head 64, by virtue of attachment to knife assembly 58 and its containment in slot 48 of cutter bar 44 or 46. Both the knife pin and receptacle should be sufficiently robust to handle the repetitive lateral forces that will be generated by prolonged cutting operation of the sickle. It should be noted however, that alternative shapes for outer surface 98 and bearing surface 116 can be used, such as but not limited to, rectangular, square, hexagonal, octagonal, and other polygons. An advantage of the cylindrical shape is that it also allows rotation of the knife head and knife assembly relative to the knife arm about a vertical axis through the knife pin, without tilting of the knife head and knife arm one relative to another.

Thus, for example, if a flexible sickle is employed, if the interface between surfaces 98 and 116 allows relative vertical movement, this movement will allow the flexible sickle to smoothly flex up and down by virtue of freedom of knife pin 84 to move upwardly and downwardly within receptacle 94, but the knife pin will be restrained against tilting or rocking movements, so as to reduce possible occurrences of binding and resultant increase in power consumption and wear.

To facilitate the ability of knife pin 84 and receptacle 94 to move freely upwardly and downwardly one relative to the other, and also rotate one relative to the other, knife arm 66 optionally includes an internal grease reservoir 118 configured for holding a quantity of grease for distribution within receptacle 94, and a connecting grease fitting 120 usable for resupplying the grease as required. Alternatively, a grease or lubricant impregnated bushing or the like can be used in receptacle 94 for reducing friction at the interface between the knife pin and knife arm. The lower end and upper end of receptacle 94 is preferably enclosed to prevent entry of contaminants such as dust, dirt and the like into the interface between bearing surface 116 and outer surface 98, a lower opening 140 being sealed with a conventional annular or ring seal 142, and the upper end in a manner discussed below.

It is anticipated that with use, bearing surface 116 of a bearing that includes this surface, and/or the bearing itself, and/or the knife pin, will wear to such an extent as to require replacement. To facilitate replacement, bearing surface 116 of receptacle 94 comprises an inner peripheral surface of a removable bearing element 122, which can comprise for instance a solid or impregnated sleeve or bushing, or a ball, needle, or spherical type bearing, press fit into a cavity 124 through lower opening 140, and the upper end of receptacle 94 is shown enclosed by a removable plug 126 which is also usable for removing the bearing element 122. The ability easily and quickly remove and replace bearing element 122 with tools available in the field is highly desired when harvesting and time is of the essence. In one preferred configuration, plug 126 is located in sealed abutment with a lower surface of a shoulder 128 extending at least partially about and defining an upper opening 130 (FIG. 13) of cavity 124, above bearing element 122 and forming the desired sealed condition against entry of contaminants and moisture. When removal and replacement of element 122 is required, plug 126 can be pressed downwardly, using a press, or, if one is unavailable, e.g., service occurs in the field, suitable tools such as a hammer and a socket 132 or other suitable item of similar diameter to the bearing element, can be used to push or tap the plug downwardly through cavity 124, and will also remove the ring seal 142 if used. In both instances, the downward movement of plug 126 will push bearing element 122 downwardly from cavity 124 through lower opening 140. Replacement then entails simply replacing plug 126 in cavity 124 against shoulder 128, and pressing or tapping the bearing element or a new one into position.

Here, it can be observed that cavity 124 and lower opening 140 have a first transverse extent or diameter, that is larger than that of upper opening 130, and that plug 126 has a transverse extent or diameter that is marginally smaller than that of the cavity 124 and lower opening, to facilitate passage of the plug therethrough, but which prevents passage through upper opening 130. Plug 126 can include a protuberance 132 extending upwardly therefrom and configured to sealably mate with and engage shoulder 128 to form the upper sealed condition. The protuberance 132 also strengthens plug 126.

Thus, with the knife head and arm assembly of the invention, most of the knife sections 60 clamped to the sickle by knife head 64 can be removed and replaced by removal of just two fasteners 78 and nuts 80, and knife pin 84 can be removed and replaced by removing knife arm 66 (requiring removing just two fasteners 110) and one fastener 86.

In another preferred configuration, as shown in various of the Figures, distal end 96 of knife arm 66 has opposite sides 136 and 138 that taper divergingly toward mounting end 100. This imparts a streamlined shape to each of the knife arms for facilitating flow of plant material thereabout. This taper is preferably embodied in a V-shape or U-shape when viewed from above, extending about distal end 96, and additionally serves to deflect the cut plant material to some extent away from the slots in forward end 32 of floor 28 of the header through which the driven elements of drives 62A and 62B extend.

Optional features of knife head 64 include controlled or limited vertical flexibility, which provides an ability to bend or flex to a limited extent with portions of a sickle attached thereto. This capability is preferably achieved by reducing the vertical height or extent of at least one longitudinal end 76 of member 70 relative to a middle or opposite end, as denoted by heights H1 and H2 in FIG. 12, resulting in a stepped shape, although it should be recognized that a tapered or other shape that imparts desired flexibility can alternatively be used.

As another optional variant of the invention, referring more particularly to FIG. 14, it is desired for knife assemblies 58 of respective cutter bar assemblies 44 and 46 to overlap in the vicinity of drives 62A and 62B, so that there is not a gap in the cutting action of the sickle. One option to avoid undesired flexing and wear of one or both of the cutter bars, one of the knife assemblies can be shimmed up or down so that neither need be flexed to travel above or below the other when reciprocatingly moved. As another option according to the invention, one of the elongate members 70 of one of the knife heads 64 has a further stepped portion 144 on its underside within the overlapping region, which here is member 70 of assembly 44. Stepped portion 144 is raised an amount H3 above the lower surface of the rest of that member 70, which amount is equal to the thickness of a knife section 60. Additionally, the knife sections 60 are attached to stepped portion 144 of member 70 directly by fasteners 72 upwardly from the underside, so that the fasteners are flush with or recessed in the underside of those knife sections and thus can overlap and be capable of relative movement over knife sections 60 of knife assembly 58 of cutter bar assembly 46, so as to eliminate this area as a source of additional wear due to bending, and any need for shimming for that purpose. To accommodate this, the knife sections 60 of cutter bar assembly 46 will be attached to beam 74 of that assembly with fasteners 72 that will be flush with or recessed in the upper surfaces of the knife sections. Here, it can be observed that stepped portion 144, because of its reduced section can be configured to provide some desired flexibility for use with a flexible cutter bar assembly, if desired.

Figure 15:
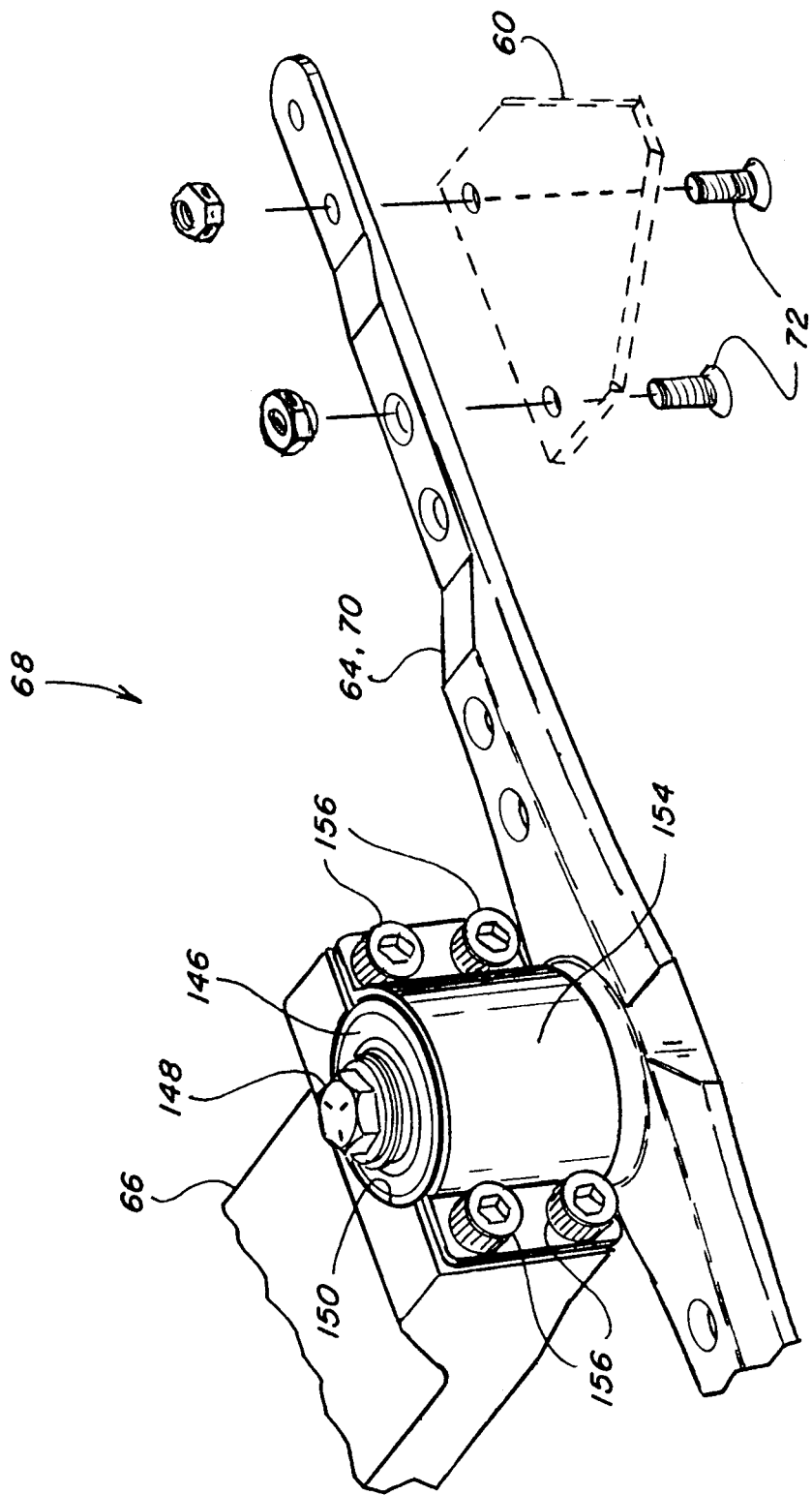
FIG. 15 is a fragmentary perspective view of an alternative knife arm and head assembly connected together with a torsion element according to the invention.

Referring more particularly to FIG. 15, knife head and arm assembly 68 is shown including alternative knife pin structure for attaching knife head 64 to knife arm 66, which comprises a torsion element 146 as the knife pin to allow some limited and controlled relative pivoting action therebetween. Torsion element 146 includes an annular bushing or block of a rubber or rubbery material having resilient elastic properties and a passage therethrough that receives or carries a threaded fastener 148 which is threadedly received in a threaded hole in elongate member 70 of knife head 64 in the same manner as described above for attachment of the knife pin 84. An outer periphery of torsion element 146 is preferably received in a receptacle 150 here comprising concavities in the end of knife arm 66, and in a companion strap 152, strap being tightenable about element 146 and secured by fasteners 154. As a result, the outer periphery of torsion element 146 is at least largely prevented from rotational movement relative to knife arm 66, and the inner periphery of the element 146 is at least largely prevented from relative pivotal movement relative to knife head 64, such that relative pivotal movement of knife head 64 and knife arm 66 is effected only by internal elastic torsional deformation of element 146. Elasticity of torsion element 146 can be advantageously configured if desired so as to allow some very limited relative vertical movement and/or twisting between the knife head and knife arm to accommodate some flexure of the cutter bar. Torsion element can also advantageously be capable of absorbing and limiting transmission of some shock loads generated by the operation of the sickle to the drive 62A or 62B connected thereto. Like the above described construction involving knife pin 84, use of torsion element 146 is also advantageous as it and fastener 148 can be removed and replaced solely from above quickly.

In light of all the foregoing, it should thus be apparent to those skilled in the art that there has been shown and described a novel knife head and arm assembly. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follows.

What is claimed is:

1. A knife head and arm assembly for connecting a sickle cutter to a reciprocating drive mechanism, comprising:
    an elongate knife head having a plurality of holes therein arranged in a longitudinally spaced array, configured and disposed for receiving a plurality of fasteners, respectively, for attaching a plurality of knife sections of the sickle cutter to a structural beam of the sickle cutter, a knife pin removably mounted at a predetermined location on the knife head in upwardly extending relation thereto, the knife pin having an outer surface extending thereabout;
    a knife pin fastener removably mounting the knife pin on the elongate knife head; and
    a knife arm having a mounting end configured for attachment to the drive mechanism for reciprocating sideward movement of the knife arm therewith, the knife arm including a distal end opposite the mounting end disposed to be supported in cantilever relation to the drive mechanism, the distal end including an inner surface bounding and defining a downwardly open receptacle configured for cooperatively receiving the knife pin with the inner surface intimately contacting the outer surface therearound for holding the knife pin in the receptacle sufficiently for the knife arm to reciprocatingly move the knife head and the attached sickle knife sections sidewardly therewith while allowing a limited amount of relative vertical movement between the knife arm and the knife head.

2. The knife head and arm assembly of claim 1, wherein the knife pin fastener is a threaded fastener extending axially through the knife pin and threadedly engaged with the knife head to allow replacing of the knife pin solely from above.

3. The knife head and arm assembly of claim 1, wherein the knife head has at least one portion spaced longitudinally from the knife pin, configured for allowing vertical flexure of the one portion relative to the knife pin.

4. The knife head and arm assembly of claim 1, wherein the knife arm has opposite sides that taper divergingly from the distal end to the mounting end for facilitating flow of plant material therepast.

5. The knife head and arm assembly of claim 4, wherein the opposite sides have a generally V-shape when viewed from above.

6. The knife head and arm assembly of claim 1, wherein the receptacle of the knife arm has an enclosed upper end.

7. The knife head and arm assembly of claim 1, wherein the outer surface of the knife pin and the inner surface of the knife arm have mating cylindrical shapes.

8. A knife head and knife arm assembly for connecting a sickle cutter to a reciprocating drive mechanism, comprising:
    an elongate knife head having a plurality of holes therein arranged in a longitudinally spaced array, receiving a plurality of fasteners, respectively, for mounting a plurality of knife sections of the sickle cutter in longitudinally extending substantially abutting end to end relation between the knife head and a structural beam of the sickle cutter in a manner allowing removing and replacing at least some of the knife sections individually while others of the knife sections remain mounted by the knife head on the structural beam, a knife pin mounted at a predetermined location on an upper surface of the knife head in upwardly extending relation thereto in a manner allowing removing and replacing the knife pin solely by access from thereabove, the knife pin having an outer surface extending thereabout;
    a knife pin fastener removably mounting the knife pin on the elongate knife head; and
    a knife arm having a mounting end for removable attachment to the drive mechanism for reciprocating sideward movement of the knife arm therewith, the knife arm including a distal end opposite the mounting end disposed to be supported in cantilever relation to the drive mechanism above the knife head, the distal end including an inner surface bounding and defining a downwardly open receptacle cooperatively receiving the knife pin with the inner surface in intimate contact with the outer surface therearound for holding the pin in the receptacle sufficiently for the knife arm to reciprocatingly move the knife head and attached sickle knife sections sidewardly therewith while allowing a limited amount of relative vertical movement between the knife arm and the knife head.

9. The knife head and arm assembly of claim 8, wherein the knife pin fastener is a threaded fastener extending axially through the knife pin and threadedly engaged with the knife head.

10. The knife head and arm assembly of claim 8, wherein the knife head has at least one portion spaced from the knife pin, configured for allowing vertical flexure of the at least one portion relative to the knife pin.

11. The knife head and arm assembly of claim 8, wherein the knife arm has opposite sides that taper divergingly from about the distal end toward the mounting end for facilitating flow of plant material therepast.

12. The knife head and arm assembly of claim 11, wherein the opposite sides of the knife arm form a generally V-shape when viewed from above.

13. The knife head and arm assembly of claim 8, wherein the receptacle of the knife arm has an enclosed upper end.

14. The knife head and arm assembly of claim 8, wherein the outer surface of the knife pin and the inner surface of the knife arm are generally cylindrical shaped.

15. A knife head and arm assembly for connecting an elongate sickle cutter to a drive mechanism to facilitate reciprocatingly longitudinally motion of the sickle cutter, the knife head and arm assembly comprising:
   a knife arm comprising a downwardly open receptacle;
   an elongate knife head configured to be attached by fasteners to an elongate structural beam of the sickle cutter; wherein the elongate knife head is configured to clamp a longitudinal side-by-side array of sickle knife sections against the elongate structural beam such that selected ones of the fasteners can be removed while the elongate knife head remains attached to the elongate structural beam to allow removing and replacing selected ones of the sickle knife sections, the elongate knife head comprising at least one longitudinally extending portion having a reduced vertical extent to allow vertical flexure thereof;
   a knife pin fastener; and
   a knife pin mounted in upstanding relation on the elongate knife head by the fastener, removable from above the elongate knife head to allow removal and replacement of the knife pin from above, the knife pin being configured to be cooperatively received in the downwardly open receptacle of the knife arm, the knife pin having a smooth straight outer surface therearound.

16. The knife head assembly of claim 15, wherein the knife arm comprises a mounting end configured for attachment to the drive mechanism for reciprocal sideward movement of the knife arm therewith, wherein the knife arm further comprises a distal end opposite the mounting end disposed to be supported in cantilever relation to the drive mechanism, the distal end comprising an inner surface bounding and defining the downwardly open receptacle configured for cooperatively receiving the knife pin with the inner surface intimately contacting the outer surface of the knife pin therearound for holding the knife pin in the receptacle sufficiently for the knife arm to reciprocatingly move the knife head and attached sickle knife sections sidewardly therewith while allowing only a limited amount of relative upward and downward movement of the knife pin and the knife arm.

17. The knife head assembly of claim 16, wherein the distal end of the knife arm has opposite sides that taper divergingly from the distal end to the mounting end for facilitating flow of plant material therepast.

18. The knife head assembly of claim 16, wherein the distal end of the knife arm has a generally V-shape when viewed from above.

19. The knife head assembly of claim 16, wherein the receptacle of the knife arm has an enclosed upper end.

20. The knife head assembly of claim 16, wherein the outer surface of the knife pin and the inner surface of the knife arm are generally cylindrical shaped.

\* \* \* \* \*